US012273837B2

(12) United States Patent
Paczkowski et al.

(10) Patent No.: US 12,273,837 B2
(45) Date of Patent: Apr. 8, 2025

(54) SYSTEMS AND METHODS FOR QUANTUM BASED NETWORK TIME VALIDATION

(71) Applicant: T-Mobile Innovations LLC, Overland Park, KS (US)

(72) Inventors: Lyle Walter Paczkowski, Mission Hills, KS (US); Marouane Balmakhtar, Fairfax, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 426 days.

(21) Appl. No.: 17/819,224

(22) Filed: Aug. 11, 2022

(65) Prior Publication Data

US 2024/0057001 A1   Feb. 15, 2024

(51) Int. Cl.
  *H04W 56/00*   (2009.01)
  *G04R 20/02*   (2013.01)
(52) U.S. Cl.
  CPC .......... *H04W 56/004* (2013.01); *G04R 20/02* (2013.01); *H04W 56/0015* (2013.01)
(58) Field of Classification Search
  CPC ............ H04W 56/004; H04W 56/0015; G04R 20/02; G06N 10/00; G06N 10/20; G06N 10/40; G06N 10/60; G06N 10/70; G06N 10/80; G06N 20/00
  See application file for complete search history.

(56) References Cited

U.S. PATENT DOCUMENTS

| | | | |
|---|---|---|---|
| 1,101,958 A | 6/1914 | Reichard | |
| 9,912,693 B1 * | 3/2018 | Balmakhtar | ........ G06F 11/3419 |
| 2016/0173352 A1 * | 6/2016 | Danielsson | ......... H04L 63/1408 |
| | | | 370/252 |
| 2020/0183938 A1 * | 6/2020 | Hu | ......................... G06N 10/80 |
| 2023/0126764 A1 * | 4/2023 | Ibrahim | ................. G06N 10/20 |
| | | | 705/44 |
| 2024/0048261 A1 * | 2/2024 | Bohm | ................... H04J 3/0667 |

OTHER PUBLICATIONS

Kellermann, T., and McElroy, R., "Global Incident Response Threat Report", VMware, Inc., pp. 1-32 (2021).
Murdock., T., "Modern Bank Heists and Best-Practices Protection", Report, Financial Services, VMware Industry Solutions, pp. 1-6 (Apr. 13, 2021).

* cited by examiner

*Primary Examiner* — Robert C Scheibel
(74) *Attorney, Agent, or Firm* — Shook, Hardy & Bacon L.L.P.

(57) ABSTRACT

Embodiments of the present disclosure provide for a quantum computing based network time validation function that can evaluate a large set of network time reference signals (e.g., a set of timestamps) and rapidly identify aberrations that can negatively affect network operation. In some embodiments, a method comprises: receiving a set of task data comprising a set of network time reference signals; searching the set of task data using a quantum search algorithm executed on a quantum computing platform, wherein the quantum search algorithm performs operations on more quantum states generated by the quantum computing platform based on a search task function defined by a quantum oracle, wherein the search task function comprises a time prediction task function; and generating an output comprising an indication of validation of the set of network time reference signals based on the searching.

20 Claims, 6 Drawing Sheets

SYSTEMS AND METHODS FOR QUANTUM BASED NETWORK TIME VALIDATION

BACKGROUND

Wireless network operations heavily rely on precision network timing to maintain synchronization between network elements. For example, in time division duplex wireless communication networks, precision timing signal is used to, among other things, orchestrate the transmission of uplink and downlink frames. Precision network timing ensures that when user equipment transmits in an uplink frame, the base station is listening, and when the base station transmits a downlink frame, the user equipment is listening. Precision network timing also ensures that for multiple access schemes, uplink transmission from multiple user equipment are synchronized to form a coherent uplink frame when received at the base station. Loss or degradation of precision network timing signals may lead to rapid network degradation and ultimately service termination. In many wireless telecommunications networks today, precision network timing is currently based on timing sequences transmitted by global positioning system (GPS) satellites, or timing sequences from other global navigation satellite systems (GNSS) (such as GLONASS, Galileo, or Beidou, for example). However, GNSS systems are not immune from events that can compromise the integrity of their timing sequences. These events may include, but are not limited to, natural interference (such as from solar flares or atmospheric conditions, for example), intentional human interference (such as signal jamming, deployment of anti-GPS devices, hacking, or governmental control), or other events that may cause the timing sequences to become unreadable, or become inaccurate indications of time. In the event of a temporary loss of reliable and accurate network timing signals, a telecommunications network may become unable to operate and/or provide connectivity to users. Moreover, as wireless networks, user devices, and internet of things (IoT) devices become more prevalent, even a greater number of devices an applications will become reliant on precision network timing.

SUMMARY

The present disclosure is directed, in part to quantum based network time validation systems and methods, substantially as shown and/or described in connection with at least one of the Figures, and as set forth more completely in the claims.

In some embodiments, the present disclosure provides for a quantum computing based network time validation function that can evaluate a large set of network time reference signals and identify instances of network clock degradation that can negatively affect network operation. The embodiments may include a network time validation function that is executed on a quantum computing platform comprising at least one quantum processor that can achieve a quantum state. The network time validation function receives task data comprising a set of network time reference signals generated by one or more network nodes that are operating as network clocks on the network. These network time reference signals define the task data upon which the network time validation function operates to assess the possibility that a master network clock generating the network time reference signals is inaccurate or degraded. If the master network clock is determined to be inaccurate, then one or more mitigating steps can be triggered.

To validate a set of network time reference signals, the network time validation function may treat the validation task as a quantum search task and search the task data (e.g., the set of network time reference signals) using an amplitude amplification quantum search algorithm (such as Grover's Algorithm, for example) to identify timing signal instances that are inconsistent with computed timing predictions. In some embodiments, a network operator may specify a degree of confidence desired from the network time validation function, and the network time validation function will perform repeated iterations on the quantum basis states based on the desired degree of confidence, converging on a more accurate prediction with each iteration.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Embodiments of the present disclosure provide for a quantum computing based network time validation function that can evaluate a large set of network time reference signals (e.g., a set of timestamps) and rapidly identify aberrations that can negatively affect network operation. For example, in cellular communication networks, inaccurate time stamps can lead to a lack of synchronization between network elements that results in radio frequency (RF) signal interference poor call quality, dropped calluses during handoffs, longer call setup times, limited bandwidth and overall inefficient spectrum use. The embodiments described herein realize a network time validation function that is executed on a quantum computing platform comprising at least one quantum processor that can achieve a quantum state. The network time validation function inputs a set of network time reference signals, each comprising a timing measurement generated by one or more network clocks on the network. These network time reference signals define the task data (and the corresponding quantum basis states) upon which the network time validation function operates to determine, within a prescribed degree of confidence, the possibility that the master network clock generating the network time reference signals is inaccurate. If the master network clock is determined to be inaccurate, then one or more mitigating steps can be triggered (e.g., such as generating an alarm, switching the network to an alternative network clock source, and/or initiating a troubleshooting process).

To validate a set of network time reference signals, the network time validation function may treat the validation task as a quantum search problem or task by searching task data (e.g., the set of network time reference signals) using an amplitude amplification quantum search algorithm (such as Grover's Algorithm, for example) to identify timing signal instances that are inconsistent with computed timing predictions. In some embodiments, a network operator may specify the degree of confidence desired from the network time validation function, and the network time validation function will perform repeated iterations on the quantum basis states (for example, a qubit state vector) based on the desired degree of confidence, converging on a more accurate prediction with each iteration. In some embodiments, amplitudes of basis states that correspond to deviations from a predicted time may be defined as solutions to the search problem and will increase in amplitude at each iteration performed by the search algorithm. Amplitudes of basis state that do not show deviations from the predicted time may be defined as non-solutions to the search problem and will decrease in amplitude each iteration. As explained in greater detail below, deviant timing signal instances identified though this search task may be reported to a network management node for further evaluation and/or implementation of mitigating steps.

Throughout the description provided herein several acronyms and shorthand notations are used to aid the understanding of certain concepts pertaining to the associated system and services. These acronyms and shorthand notations are intended to help provide an easy methodology of communicating the ideas expressed herein and are not meant to limit the scope of embodiments described in the present disclosure. Unless otherwise indicated, acronyms are used in their common sense in the telecommunication arts as one skilled in the art would readily comprehend. Further, various technical terms are used throughout this description. An illustrative resource that fleshes out various aspects of these terms can be found in Newton's Telecom Dictionary, 31st Edition (2018).

The subject matter described herein is generally described in the context of a wireless communications network. This is done merely for the sake of clarity and those skilled in the art may, upon reading this description, understand other contexts in which the subject matter may be utilized. For example, the quantum computing based network time validation function embodiments described herein may be implemented in the context of other networks, such as but not limited to data centers, commercial and business networks, infrastructure networks (such as an A/C power grid), economic and/or financial networks (such as high-frequency trading, flash trading, and generalized electronic trading), air traffic control networks, first responder networks (such as EMS, police, fire rescue, and the like), amongst others. Again, however, even these examples are not provided to limit the scope of this description.

As used herein, the terms "function", "unit", "node" and "module" are used to describe computer processing components and/or one or more computer executable services being executed on one or more computer processing components. In the context of this disclosure, such terms used in this manner would be understood by one skilled in the art to refer to specific network elements and not used as nonce word or intended to invoke 35 U.S.C. 112(f).

Figure 1:
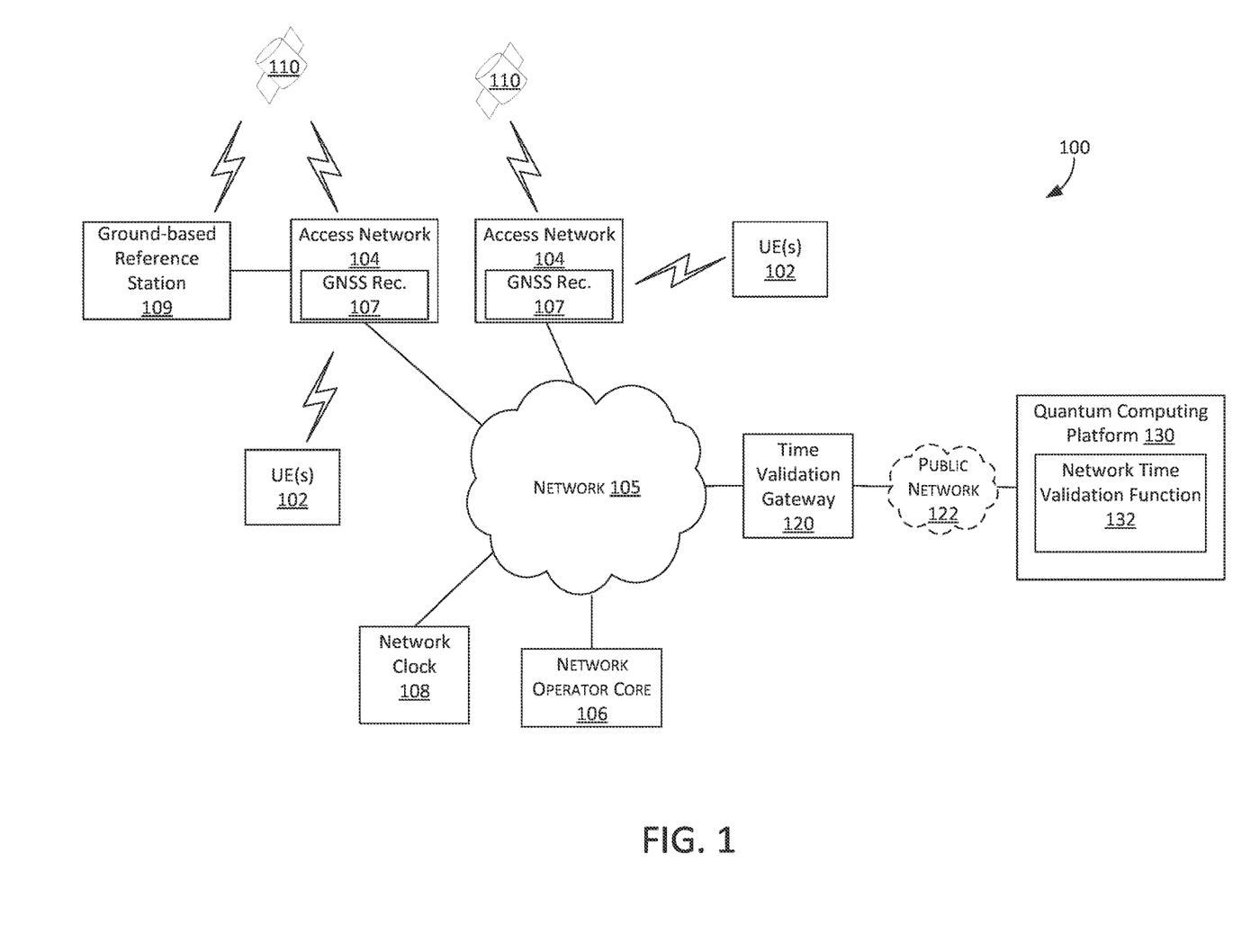
FIG. 1 is a diagram illustrating an example network environment, in accordance with some embodiments described herein.

FIG. 1 is a diagram illustrating an example network environment 100 embodiment. Network environment 100 is but one example of a suitable network environment for use in implementing embodiments of the present disclosure and is not intended to suggest any limitation as to the scope of use or functionality of the embodiments disclosed herein. Neither should the network environment be interpreted as having any dependency or requirement relating to any one or combination of components illustrated.

As shown in FIG. 1, network environment 100 comprises a network operator core 106 (also referred to as a "Core Network") that provides one or more network services to one or more UE 102 via one or more access network(s) 104. UE 102 are, in general, forms of equipment and machines such as but, not limited to, Internet-of-Things (IoT) devices and smart appliances, autonomous or semi-autonomous vehicles including cars, trucks, trains, aircraft, urban air mobility (UAM) vehicles and/or drones, industrial machinery, robotic devices, exoskeletons, manufacturing tooling, thermostats, locks, smart speakers, lighting devices, smart receptacles, controllers, mechanical actuators, remote sensors, weather or other environmental sensors, wireless beacons, or any other smart device that at least in part operated based on micro-service data received via a network. U E 102 may also include handheld personal computing devices such as cellular phones, tablets, and similar consumer equipment, or stationary desktop computing devices, workstations, servers and/or network infrastructure equipment. As such, the UE 102 may include both mobile UE and stationary UE. In some embodiments, network environment 100 comprises a wireless communications network.

In some embodiments, one or more of the access networks 104 may comprise a radio access network (RAN), often referred to as a cellular base station. The access network 104 may be referred to as an eNodeB in the context of a 4G Long-Term Evolution (LTE) implementation, a gNodeB in the context of a 5G New Radio (NR) implementation, or other terminology depending on the specific implementation technology. In some embodiments, the access network 104 comprises a non-3GPP customer premises network, such as a local area network or intra-net comprising one or more wireless access points (APs) such as, but not limited to, IEEE 802.11 (WiFi), and/or IEEE 802.15 (Bluetooth) access points. In particular, each UE 102 within a coverage area of an access network may communicate with the network operator core 106 via the access network 104 over one or both of uplink (UL) radio frequency (RF) signals and downlink (DL) radio frequency (RF) signals. The access network 104 may be coupled to the network operator core 106 via a core network edge that comprises wired and/or wireless network connections that may themselves include wireless relays and/or repeaters.

In some embodiments, an access network 104 is coupled to the network operator core 106 at least in part by the Internet or other public or private network infrastructure. In some embodiments, the network operator core 106 may be coupled to the access network(s) 104 via a network 105 that comprises one or more network nodes or other elements. Network 105 can include multiple networks, or a network of networks, but is shown in simple form so as not to obscure aspects of the present disclosure. By way of example, network 105 can include one or more wide area networks (WANs), one or more local area networks (LANs), one or more public networks such as the Internet, and/or one or more private networks. Where network 105 includes a wired and/or wireless telecommunications network, it may further comprise components such as a base station, a communications tower, or even access points (as well as other components) to provide wireless connectivity. In some embodiments, the network 105 comprises a network edge that defines the boundary of the network operator core 106 and serve as the architectural demarcation point where the network operator core 106 connects to other networks such as, but not limited to access network 104, the Internet, or other third-party networks. It should be understood that in some aspects, the network environment 100 may not comprise a distinct network operator core 106, but rather may implement one or more features of the network operator core 106 within other portions of the network, or may not implement them at all, depending on various carrier preferences.

In aspects, each access network 104 may comprise a RAN that is installed at a fixed location, such as a communication tower. The communication tower may be a structure designed to support one or more antennas for communications and/or broadcasting. In other embodiments, access network 104 comprises a mobile base station, small cell, mini cell, micro cell, pico cell, and/or a femto cell. In this way, access network 104 can facilitate wireless communications between UE 102 and other devices. The access network 104 may include at least one baseband unit (BBU) responsible for, among other things, digital baseband signal processing. For instance, CDMA/EVDO and LTE Internet protocol (IP) packets are received from a wireless communications network and are digitally combined by the BBU at the access network 104. The blended digital baseband signal is transmitted to a radio at the access network 104. Digital baseband signals received from the radio are demodulated by the BBU and the resulting IP packets are transmitted by the BBU to the network operator core 106. The access network 104 may include a radio (not shown) or a remote radio head (RRH) that generally communicates with one or more antennas associated with the access network 104. The access network 104 may support multiple-input-multiple-output (MIMO) and/or time division duplex or any other suitable communication protocols. Notably, the preceding nomenclature is used with respect to 3GPP 4G and 5G architectures. In other aspects, each of the preceding functions and/or modules may take different forms, including consolidated or distributed forms that perform the same general operations.

The various network elements coupled to the network 105, such as the network operator core 106, UE(s) 102, and access network(s) 104, and various other network components of network 105, may comprise local clocks that are synchronized with each other using network time reference signals.

These network time reference signals may include timestamps generated by a network clock source that is designated as the master clock source for network 105. For example, in some embodiments, network 105 implements the IEEE 1588 Precision Time Protocol (PTP) that determines the most accurate clock in network 105, and then synchronizes all other clocks to that master network clock. In some embodiments, a network clock serving as the master network clock sends packets with embedded timestamps to the other network clocks across the network 105 to establish synchronizing between network clocks. In some embodiments, the master clock source may comprise a network node such as network clock 108, for example. In some embodiments, the function of the master clock source may be performed by other network components or distributed between multiple network clock sources. As such, network time reference signals may comprise a plurality of network time reference signals generated by one or more network clock sources.

For example, in the embodiment of FIG. 1, the network time reference signals are by default generated by one or more of the access network(s) 104 from Global Navigation Satellite System (GNSS) broadcast timing sequences received via a GNSS receiver 107. In this capacity, any one or more of the access networks 104 may function as a network clock source. GNSS satellites 110 (such as Global Positioning System (GPS), satellites for example) are equipped with atomic clocks that are accurate to within nanoseconds, and the clocks of the constellations of GNSS satellites 110 are in synchronization with each other. In some embodiments, the access network(s) 104 comprise GNSS receivers that receive the timing sequences, and from the timing sequences derive the network time reference signal. In some embodiments, the timing sequences from GNSS satellites 110 may be received by a GNSS receiver at a ground based reference station 109. The ground based reference station 109 may then provide the timing sequence to an access network 104 which then derives the network time reference signal. In this way, the GNSS satellites 110 function in conjunction with an access network 104 as the master timing source for network time reference signals used by the network 105, including the access networks 104, UEs 102 and the network operator core 106.

As previously discussed, the timing sequences transmitted from GNSS satellites 110 may be intentionally or unintentionally disrupted and/or become degraded, negatively affecting the accuracy of network time reference signals derived from those timing sequences. The embodiments described herein therefore provide for a network time validation function to validate the accuracy of network time reference signals derived from the current master timing source. To this end, the network environment 100 further include a time validation gateway 120 coupled to the network 105. The time validation gateway 120 comprises a node of the network 105 that selectively forwards network time reference signals from network 105 to a network time validation function 132 executed on a quantum computing platform 130. The quantum computing platform 130 comprises one or more quantum processors that can achieve a quantum state for executing quantum algorithms. Example quantum algorithms that quantum computing platform 130 may execute include one or more of, but are not limited to, Shor's algorithm (e.g., for computing prime factors of an integer), Grover's Algorithm (e.g., for searching unstructured database and/or unordered list), and/or Quantum-Resistant Cryptographic Algorithms (e.g., the CRYSTALS-Kyber algorithm for general encryption and the CRYSTALS-Dilithium, FALCON, and SPHINCS+algorithms for digital signatures). In some embodiments, time validation gateway 120 is coupled to the quantum computing platform 130 via a public network 122, such as but not limited to the Internet. The network time validation function 132 may be executed within the context of a quantum computing instance instantiated by the quantum computing platform 130 and made accessible to the time validation gateway 120.

The time validation gateway 120 may be controlled from a management node (such as from network operator core 106, for example) to select which sets of network time reference signals are applied to the network time validation function 132 for validation, or selection may be automatically controlled by the time validation gateway 120 based on a policy or predetermined criteria. For example, the time validation gateway 120 can forward network time reference signals to the network time validation function 132 generated by a specific one of the access networks 104, a specific subset of the access networks 104, or from all of the access networks 104. Each network time reference signal passed to the network time validation function 132 is an element of task data that corresponds to a quantum basis state evaluated by the network time validation function 132, with each base state expressed as an amplitude (e.g., a probability amplitude comprising a complex number).

Given the set of task data (e.g., the sets of network time reference signals) provided by the time validation gateway 120, the network time validation function 132 may determine, within a prescribed degree of confidence, the possibility that the current master clock source for the network 105 is inaccurate. Validation result may be reported by the network time validation function 132 back to the time validation gateway 120. In this way, the network time validation function 132 can be used by applications or processes on the network to leverage quantum computer power of platform 130 to produce an estimate of a notion of accuracy of the current network time. If the master clock source is determined to be inaccurate, then one or more mitigating steps can be triggered (e.g., such as switching the network to an alternative master clock source or sending an alert or alarm message to a network management node). In some embodiments, validations of the accuracy of network time reference signals may be determined with respect to whether individual network time reference signals are accurate from an absolute perspective, or from a relevant perspective (e.g., the time between a series of network time reference signals). In some embodiments, the network time validation function 132 determines a likelihood of accuracy (as further discussed below) and when the network time validation function 132 determines that there is a shift in the likelihood of accuracy (e.g., by more than a predetermined percentage or other threshold), then the one or more mitigating steps can be triggered.

Figure 2:
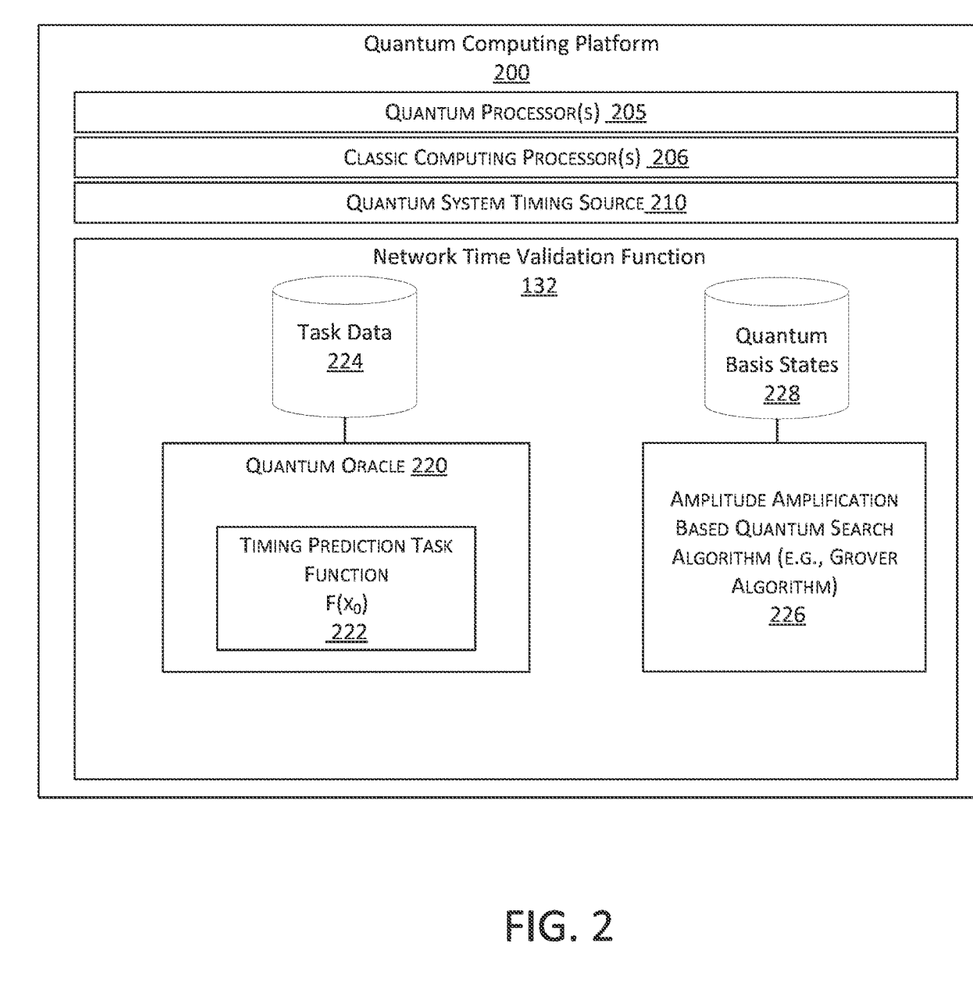
FIG. 2 is a diagram illustrating a quantum computing platform hosting a network time validation function, in accordance with some embodiments described herein.

FIG. 2 is a diagram further illustrating a quantum computing platform 200 such as the quantum computing platform 130 illustrated in FIG. 1 for executing the network time validation function 132. The quantum computing platform 200 comprises one or more quantum processors 205 that can achieve a quantum state for executing quantum algorithms, such as one or more oracles and search algorithms. In some embodiments, the quantum computing platform 200 further comprises at least one quantum system timing source 210 which may generate a quantum time reference signal used by the quantum processors 205 and/or other elements of quantum computing platform 200 and/or network environment 100. For example, in some embodiments quantum system timing source 210 serves as an alternative network clock source and may become the master clock source when network clock degradation is identified by the network time validation function 132. Moreover, the network time validation function 132 may be used to validate network time reference signals generated by quantum system timing source 210 when the quantum system timing source 210 is serving as the master network clock for the network, or for other purposes. In some embodiments, the quantum computing platform 200 is implemented as a hybrid quantum processing system comprising both the one or more quantum processors 205 and at least one classic computing processor 206 (e.g., one or more central processing units (CPUs), graphics processing units (GPUs), or similar classical processors). With a hybrid quantum processing system, components of the network time validation function 132 comprising classical computing algorithms may be executed by the classic computing processor(s) 206 while quantum components of the network time validation function 132 (such as the amplitude amplification based quantum search algorithm 226, one or more functions of the quantum oracle 220, and other operations on the quantum state and state vector) are executed by the one or more quantum processors 205.

In this embodiment, the quantum computing platform 200 executes a network time validation function 132 that comprises a quantum oracle 220 and an amplitude amplification quantum search algorithm 226 (such as Grover's Algorithm, for example). The Grover's Algorithm is an example of an amplitude amplification quantum search algorithm that known in the field of quantum computing and often used for searching a database. In the embodiments presented herein, the network time validation function 132 executes the task of network time reference signal validation as a quantum search task. In some embodiments, a set of network time reference signals are received from the time validation gateway 120 and stored as the task data 224. This set of network time reference signals may be derived from the network time reference signals generated by the master network clock. The task data 224 effectively serves as the database that is searched for network time anomalies by the network time validation function 132. As explained below, the network time validation function 132 searches the task data 224 to identify any instances of network time reference signals that have values inconsistent with predicted values, which may be used to determine the likelihood of accuracy of the network time reference signals within the task data 224.

A distinguishing feature of quantum computing over traditional computing is the use of superposition to operate simultaneously on a set of quantum basis states 228 (e.g., a qubit state vector), each basis state having an amplitude corresponding to a probability that a timestamp stored in the task data 224 is accurate or inaccurate. When the task data 224 is initially loaded, the quantum basis states 228 are initialized to have uniform superposition (e.g., equal amplitudes), since at that point no determinations have been made as to whether any of the items of task data 224 represent accurate or inaccurate network time reference signals. With quantum computing, operations to identify all the inaccurate items (e.g., network time reference signals) from task data 224 can be performed by manipulating the quantum basis states 228 in substantially less time than that a traditional computer would take to perform such a search. This allows the timestamp validation gateway 120 to perform network time reference signal validation audits on network 105 at a sufficient frequency to quickly detect when accuracy degradation is occurring, and to react to such detections quickly enough to potentially minimize resulting degradation to the operations of network 105, access networks 104, UEs 102, and/or any other network elements that rely on accurate network time reference signals to operate.

In general terms, the search task performed by the network time validation function 132 can be expressed as a search task function f(x) that accepts as an input parameter the item "x". If the item x is a solution to the search task, then f(x)=1. Otherwise, if x is not a solution to the search task, then f(x)=0. For some embodiments, the search task performed by the network time validation function 132 may be more specifically expressed by a representation of Grover's algorithm where for a given input, {0, . . . , n}, (x)=1∀x=r‖f(r)=1 and f(x)=0∀x≠r, where r is the winning solution state.

Each network time reference signal (e.g., network timestamp) of the task data 224 defines an item x which may potentially either be a solution, or a non-solution, to the search task function f(x). In embodiments, for each network time reference signal, the network time validation function 132 processes and evaluates a corresponding one or more basis states of the quantum basis states 228. The search task function f(x) is implemented by the quantum oracle 220 and applied by the amplitude amplification quantum search algorithm 226 to solve the search problem and interpret the results. As previously mentioned, an advantage of quantum computing is the ability for the network time validation function 132 to perform calculations on individual inputs and on superpositions of inputs to find the solutions to the search task function 4x). For example, the expression |NO> may be used to represent the superposition of all basis states 228 that are not a solution to the search task function f(x), whereas |YES> may be used to represent the superposition of all basis states 228 that are a solution to the search task function f(x).

As indicated in FIG. 2, in some embodiments, the quantum oracle 220 comprises a search task function f(x) that is defined in terms of a time prediction task function f(x) 222. In other words, the search task function f(x) 222 may, for example, compute a prediction of the value of a next network time reference signal given the values of one or more previous network time reference signals. If the search task is defined as the task of finding those network time reference signals not conforming to the prediction, then a timestamp received for validation having the predicted value (e.g., within a predefined tolerance) would be considered a non-solution to the search task (e.g., f(x)=0) and may be validated, whereas a timestamp received for validation not having the predicted value (e.g., not within a predefined tolerance) would be considered a solution to the search task then (e.g., f(x)=1) and not validated. In such an implementation, the amplitude amplification quantum search algorithm 226 is applied to search the task data 224 to identify those non-conforming network time reference signals that are in error (e.g., a high likelihood of being inaccurate) and therefore cannot be validated. If no timestamp corresponds to a solution to the search task then all network time reference signals of the task data 224 are validated.

Conversely, if the search task is defined as the task of finding those network time reference signals that are conforming to the prediction, then a timestamp received for validation having the predicted value (e.g., within a predefined tolerance) would be considered a solution to the search task (e.g., f(x)=1) and may be validated, whereas a timestamp received for validation not having the predicted value (e.g., not within a predefined tolerance) would be considered a non-solution to the search task then (e.g., f(x)=0) and not validated. In such an implementation, the amplitude amplification quantum search algorithm 226 is applied to search the task data 224 to identify those conforming network time reference signals that are in compliance with the predicted value and therefore can be validated.

Because the quantum oracle 220 and search algorithm 226 are implemented at least in part as quantum functions, network time validation function 132 can analyze all of the basis states 228 at one time. For various different embodiments, different algorithms may be used for the time prediction task function f(x) 222 to predict network time reference signal values (e.g., timestamp values). For example, in some embodiments, the time prediction task function f(x) 222 may comprise a simple linear extrapolation function to predict network time reference signal values based on prior network time reference signal values. In other embodiments, the time prediction task function f(x) 222 may comprise a propagator/estimator function, such as a Kalman filter, to predict network time reference signal values as estimator states. For example, the Kalman filter may provide predictions for future network time reference signal values given network time reference signals observed over time.

In some embodiments, the network time validation function 132 receive as task data 224 a set of network time reference signals for validation. The quantum oracle 220 may then initialize the set of quantum basis states 228 with a uniform superposition, with one or more respective quantum basis states corresponding to a network timestamp of the task data 224. The quantum oracle 220 may perform a phase inversion of the set of quantum basis states 228 by multiplying by −1 a phase of each quantum basis state that corresponds to a solution to a time prediction task function, f(x) 222. Then, with the amplitude amplification quantum search algorithm 226, network time validation function 132 may apply a diffusions operator (e.g., a Grover diffusion operator) to the set of quantum basis states 228 to amplify an amplitude of each basis state of the set of quantum basis states 228 that comprises a solution to the time prediction task function 222, and attenuate an amplitude of each basis state of the set of quantum basis states 228 that comprises a non-solution to the time prediction task function 222. The diffusions operator performs an inversion of each basis state about the average amplitude of the basis state vectors. The diffusion operator decreases the amplitudes of the basis states greater than the average of the amplitudes, and increases the amplitudes of basis states that are less than the average of the amplitudes. Accordingly, one iteration of applying the quantum oracle and the diffusions operator serves to increase the amplitudes of the basis states that are solutions to the time prediction task function, and decrease the amplitudes of the basis states that are not solutions to the time prediction task function, to yield a first pass at predicting whether network time reference signals in the collected task data 224 are valid or not.

Iteratively repeating application of the phase inversion and diffusions operator a multiple number of times will further introduce deviations in the observable amplitudes of basis states, causing basis states that are solutions to further increase in amplitude and basis states that are not solutions to further decrease in amplitude. As such, the greater number of iterations that these steps are performed, the higher the degree of confidence will be that the basis states with the greater amplitudes are solutions to the time prediction task function f(x) 222.

In some embodiments, the time validation gateway 120 passes to the network time validation function 132 a confidence parameter indicating the degree of confidence desired from the network time validation function. The network time validation function 132 would then iteratively repeat application of the phase inversion and diffusions operator a number of times based on the confidence parameter to achieve the indicated confidence. Once the specified number of iterations are performed, the amplitude amplification quantum search algorithm 226 measures the state of the quantum base states 228, outputting the results to the quantum oracle 220. The quantum oracle 220 correlates the results with the task data 224, to identify those network time reference signals that have a high probability of being inaccurate or corrupted (and therefore cannot be validated). In some embodiments, the quantum oracle 220 may apply a network operator defining a threshold to quantum base state amplitudes to determine when one or more network time reference signals are accurate or inaccurate. In some embodiments, a list or other indication of any network time reference signals that cannot be validated is transmitted by the network time validation function 132 to the time validation gateway 120 to take further actions. In some embodiments, an indication of validity is applied the set of network time reference signals (e.g., the set as a whole may be indicated as either validated or as having degradations).

As mentioned above, the time validation gateway 120 may determine which instances of network time reference signals from network 105 are passed to the network time validation function 132 to form task data 224. The time validation gateway 120 may pass network time reference signals obtained from separate network servers operating in parallel as a network clock, or reference signals obtained from a single network time server. The time validation gateway 120 may also specify to the network time validation function 132 to search for different types of anomalies indicative of a network clock degradation. For example, the network time validation function 132, based on an instruction from the time validation gateway 120, may search for out of sequence network time reference signals. As another example, the network time validation function 132, based on an instruction from the time validation gateway 120, may search for a lack of uniform delay between otherwise in-sequence network time reference signals.

In some embodiments the time validation gateway 120 may perform one or more troubleshooting processing using the network time validation function 132 in response to suspected degradations in network time reference signals. For example, in one implementation the time validation gateway 120 may execute a process that starts with passing the network time reference function 132 for validation, a sample of signals passed to the network 105 from one or two access networks 104. If degraded network time reference signals (e.g., a set that cannot be validated) are detected by the network time validation function 132, then in an iterative fashion, larger samplings of network time reference signals from additional access networks and/or other network clocks can similarly be sampled and passed to the network time reference function 132 for validation to determine if larger segments of the network environment 100 are similarly being effected by degradations in network timing. In another implementation the time validation gateway 120 may execute a process that starts with sample of signals from a large number of access networks 104 and/or other network clocks. If degraded network time reference signals (e.g., a set that cannot be validated) are detected by the network time validation function 132, then in an iterative fashion, samplings of network time reference signals from successively smaller subsets of access networks and/or other network clocks can similarly be sampled and passed to the network time reference function 132 for validation to attempt to narrow down and possibility isolate specific network equipment causing degraded network time reference signals to be generated on the network 105.

Figure 3:
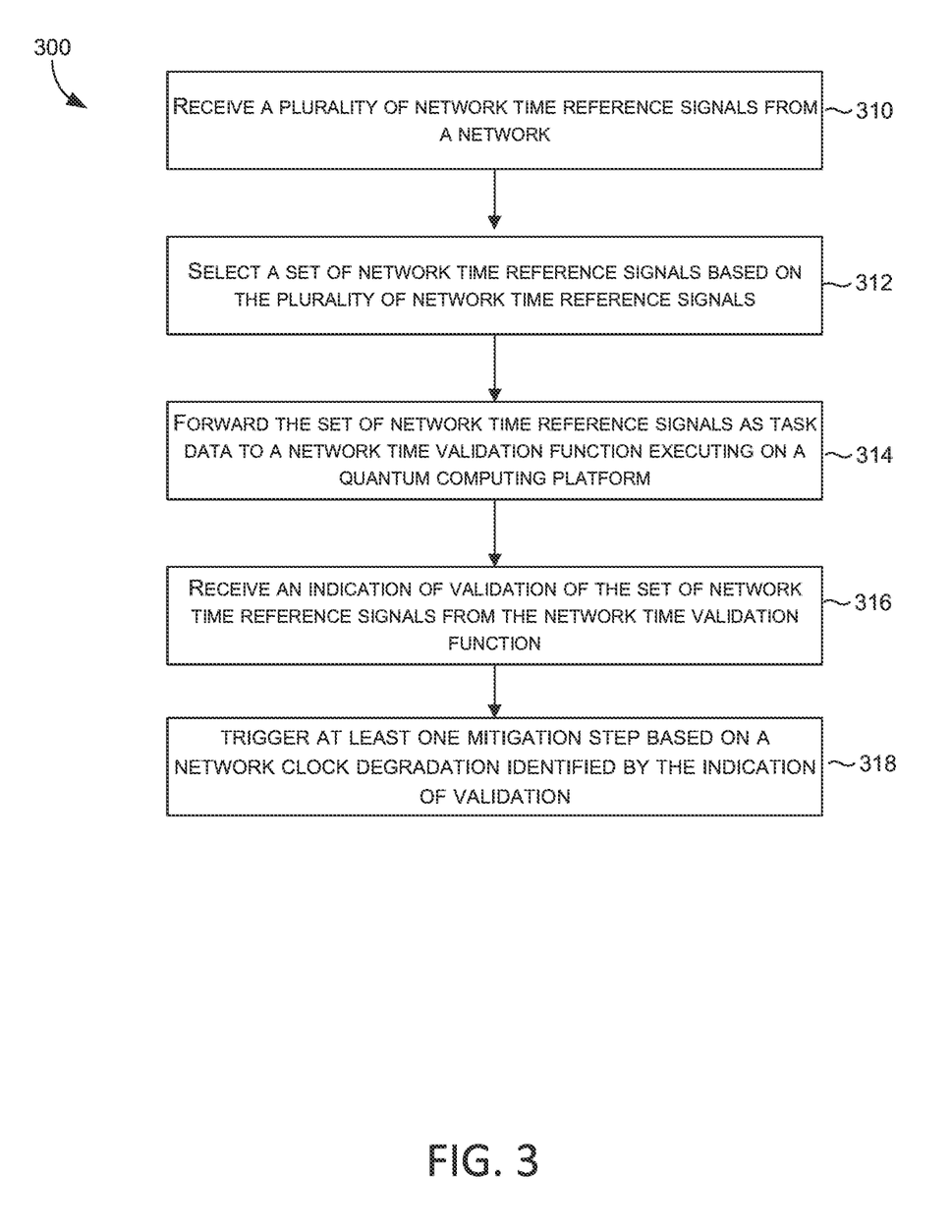
FIG. 3 is a flow chart illustrating an example method in accordance with some embodiments described herein.

FIG. 3 is a flow chart illustrating a method 300 according to one embodiment. It should be understood that the features and elements described herein with respect to the method of FIG. 3 may be used in conjunction with, in combination with, or substituted for elements of, any of the other embodiments discussed herein and vice versa. Further, it should be understood that the functions, structures, and other descriptions of elements for embodiments described in FIG. 3 may apply to like or similarly named or described elements across any of the figured and/or embodiments described herein and vice versa. In some embodiments, elements of method 300 are implemented utilizing a network environment 300 as disclosed above and may be implemented as operations on one or more processors.

The method 300 begins at 310 with receiving a plurality of network time reference signals from a network. The various network elements (e.g., network nodes) coupled to the network (e.g., such as the network operator core 106, UE(s) 102, and access network(s) 104, and various other network components of network 105), may comprise local clocks that are synchronized with each other using the network time reference signals. Network time reference signals may include, for example, timestamps generated by a network clock source that is designated as the master clock source for network. The plurality of network time reference signals may be generated by one or more network clock sources. In some embodiments, the plurality of network time reference signals may be generated based on Global Navigation Satellite System (GNSS) broadcast timing sequences by at least one access network coupled to the network. The network may comprise at least in part a telecommunications network, wherein one or more user equipment communicate with a network operator core via the at least one access network using at least in part one or both of uplink (UL) radio frequency (RF) signals and downlink (DL) radio frequency (RF) signals.

The method 300 at 312 includes selecting a set of network time reference signals for validation based on the plurality of network time reference signals. The set of network time reference signals may be a subset of the plurality of network time reference signals that are selected based on which nodes of the network the network time reference signals are received from. For example, the selected subset may include network time reference signals generated by a specific one of the access networks, a specific subset of the access networks, from all of the access networks, and/or from other network clock sources.

The method 300 at 314 includes forwarding the set of network time reference signals as task data to a network time validation function executing on a quantum computing platform, the network time validation function comprising at least a quantum search algorithm. In some embodiments, the network time validation function comprises an amplitude amplification based quantum search algorithm and a quantum oracle. The amplitude amplification based quantum search algorithm may perform operations on one or more quantum states generated by the quantum computing platform based on a search task function defined by the quantum oracle to identify the network clock degradation from the task data. The search task function may comprise a time prediction task function. The quantum oracle may determine network clock degradation based on whether one or more network time reference signals of task data that do, or do not, conform to timing predictions per the search task function. In various embodiments, different algorithms may be used for a time prediction task function to predict network time reference signal values (e.g., timestamp values). For example, in some embodiments, the time prediction task function may comprise a simple linear extrapolation function to predict network time reference signal values based on prior network time reference signal values. In other embodiments, the time prediction task function may comprise a propagator/estimator function, such as a Kalman filter, to predict network time reference signal values as estimator states.

The method 300 includes at 316 receiving an indication of validation of the set of network time reference signals from the network time validation function. The task data effectively serves as a database that is searched for network time anomalies by the network time validation function. The network time validation function searches the task data to identify any instances of network time reference signals that have values inconsistent with predicted values. Such inconsistencies may be an indication of network clock degradation. In some embodiments, quantum search algorithm is applied to search the task data to identify those non-conforming network time reference signals that are in error and therefore cannot be validated. The results may be included in the indication of validation. The method 300 at 318 includes triggering at least one mitigation step based on a network clock degradation identified by the indication of validation. When the set of network time reference signals cannot be validated, then one or more mitigating steps can be triggered such as switching the network to an alternative network clock source or triggering an alert or alarm (for example, by sending a message or signal to a network management node.) or initiating a troubleshooting process.

Figure 4:
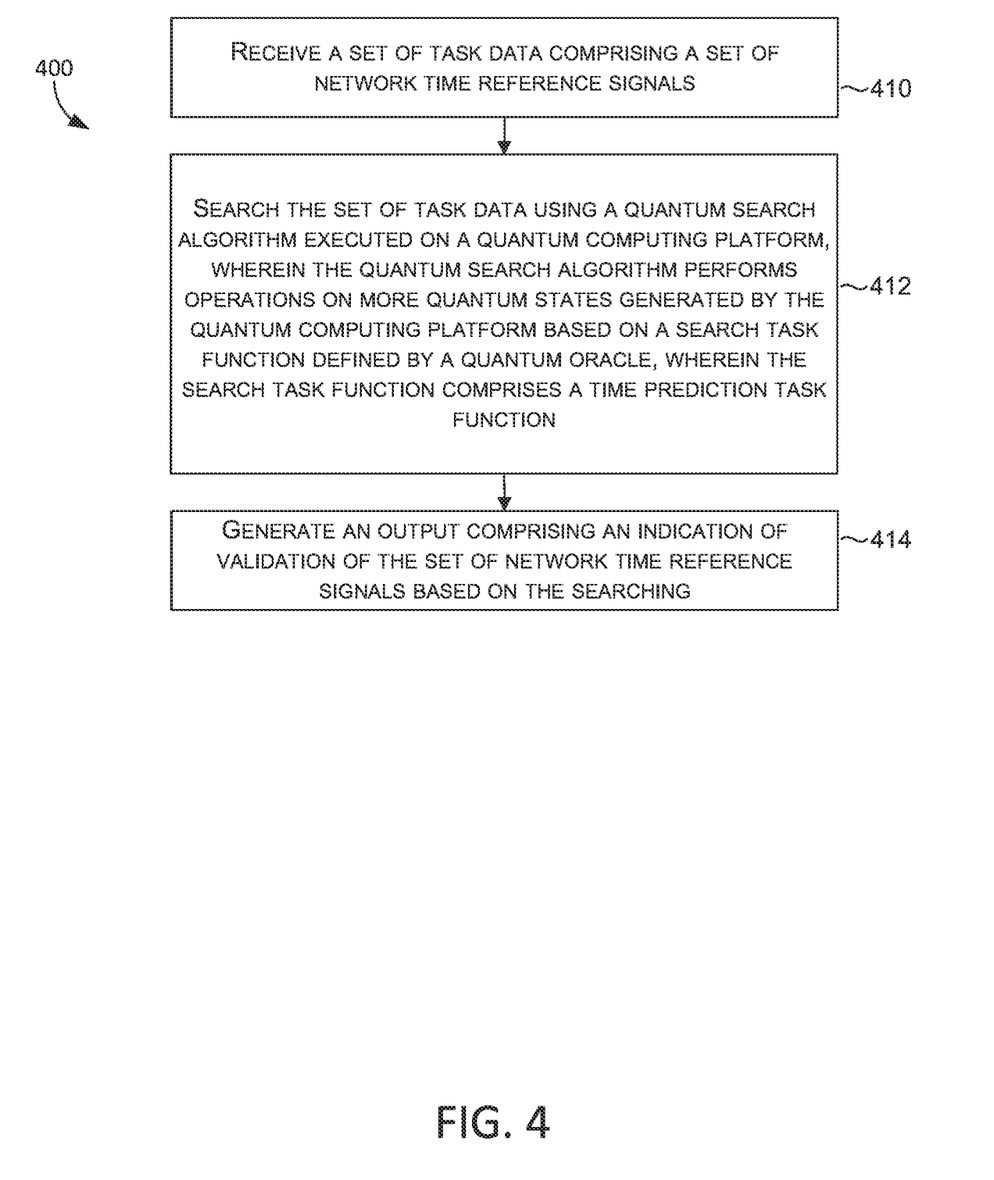
FIG. 4 is a flow chart illustrating another example method in accordance with some embodiments described herein.

FIG. 4 is a flow chart illustrating a method 400 for an network time reference function, according to one embodiment. It should be understood that the features and elements described herein with respect to the method of FIG. 4 may be used in conjunction with, in combination with, or substituted for elements of, any of the other embodiments discussed herein and vice versa. Further, it should be understood that the functions, structures, and other descriptions of elements for embodiments described in FIG. 4 may apply to like or similarly named or described elements across any of the figured and/or embodiments described herein and vice versa. In some embodiments, elements of method 400 are implemented utilizing a network environment 100 as disclosed above and may be implemented as operations on one or more processors and/or in conjunction with elements of method 300.

The method 400 at 410 includes receiving a set of task data comprising a set of network time reference signals. Network time reference signals may include, for example, timestamps generated by a network clock source that is designated as the master clock source for network. In some embodiments, the plurality of network time reference signals may be generated based on Global Navigation Satellite System (GNSS) broadcast timing sequences by at least one access network coupled to the network.

The method 400 at 412 includes searching the set of task data using a quantum search algorithm executed on a quantum computing platform, wherein the quantum search algorithm performs operations on more quantum states generated by the quantum computing platform based on a search task function defined by a quantum oracle, wherein the search task function comprises a time prediction task function. In some embodiments, the quantum oracle comprises a search task function f(x) that is defined in terms of a time prediction task function f(x). In other words, the search task function f(x) may, for example, compute a prediction of the value of a next network timestamp given the values of one or more previous network time reference signals. For various different embodiments, different algorithms may be used for the time prediction task function f(x) to predict network time reference signal values. For example, in some embodiments, the time prediction task function f(x) may comprise a linear extrapolation function to predict network time reference signal values based on prior network time reference signal values. In other embodiments, the time prediction task function f(x) may comprise a propagator/estimator function, such as a Kalman filter, to predict network time reference signal values as estimator states. In some embodiments, the quantum search algorithm comprises an amplitude amplification quantum search algorithm that applies a diffusions operator (e.g., a Grover diffusion operator) to the set of quantum basis states to amplify an amplitude of each basis state of the set of quantum basis states that comprises a solution to the time prediction task function, and attenuate an amplitude of each basis state of the set of quantum basis states that comprises a non-solution to the time prediction task function. The time validation gateway may pass to the network time validation function a confidence parameter indicating the degree of confidence desired from the network time validation function. The network time validation function would then iteratively repeat application of the phase inversion and diffusions operator a number of times based on the confidence parameter to achieve the indicated confidence.

The method 400 at 414 includes generating an output comprising an indication of validation of the set of network time reference signals based on the searching. In some embodiments, once the specified number of iterations are performed, the amplitude amplification quantum search algorithm measures the state of the quantum base states and outputting the results to the quantum oracle. The quantum oracle correlates the results with the task data, to identify those network time reference signals that have a high probability of being inaccurate or corrupted (and therefore cannot be validated). An indication of validation can indicate when the set of network time reference signals includes network time reference signals that have a high probability of being inaccurate or corrupted. The quantum oracle may apply a threshold to quantum base state amplitudes to determine when one or more network time reference signals are accurate or inaccurate. In some embodiments, a list or other indication of any network time reference signals that cannot be validated is transmitted by the network time validation function to the time validation gateway.

Figure 5:
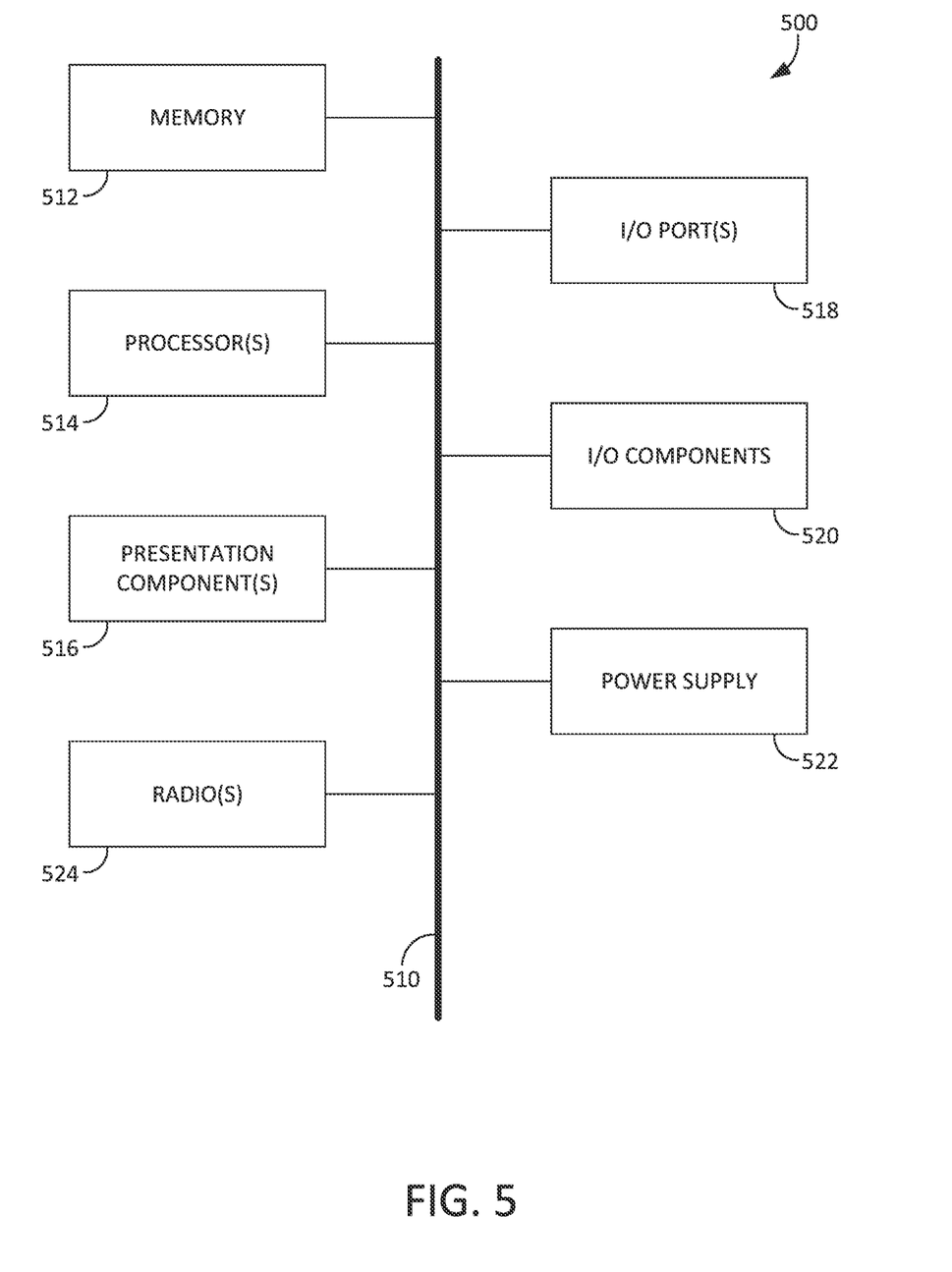
FIG. 5 is diagram illustrating an example computing environment according to an embodiment.

Referring to FIG. 5, a diagram is depicted of an exemplary computing environment suitable for use in implementations of the present disclosure. In particular, the exemplary computer environment is shown and designated generally as computing device 500. Computing device 500 is but one example of a suitable computing environment and is not intended to suggest any limitation as to the scope of use or functionality of the embodiments described herein. Neither should computing device 500 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 5, computing device 500 includes bus 510 that directly or indirectly couples the following devices: memory 512, one or more processors 514, one or more presentation components 516, input/output (I/O) ports 518, I/O components 520, power supply 522, and radio 524. Bus 510 represents what may be one or more busses (such as an address bus, data bus, or combination thereof). The devices of FIG. 5 are shown with lines for the sake of clarity. However, it should be understood that the functions performed by one or more components of the computing device 500 may be combined or distributed amongst the various components. For example, a presentation component such as a display device may be one of I/O components 520. Also, processors, such as one or more processors 514, may have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 5 and refer to "computer" or "computing device." In some embodiments, the time validation gateway, for example, or other elements as described in any of the examples of this disclosure may be implemented at least in part by code executed by the one or more processors(s) 514. In some embodiments, the one or more processors(s) 514 may comprise a combination of one or more classical computing processors (such as processors 206) and one or more Quantum processors (such as processors 205) for implementing the network time validation function 132.

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes non-transient RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer-storage media in the form of volatile and/or nonvolatile memory. Memory 512 may be removable, nonremovable, or a combination thereof. Exemplary memory includes solid-state memory, hard drives, optical-disc drives, etc. Computing device 500 includes one or more processors 514 that read data from various entities such as bus 510, memory 512 or I/O components 520. One or more presentation components 516 presents data indications to a person or other device. Exemplary one or more presentation components 516 include a display device, speaker, printing component, vibrating component, etc. I/O ports 518 allow computing device 500 to be logically coupled to other devices including I/O components 520, some of which may be built in computing device 500. Illustrative I/O components 520 include a microphone, joystick, game pad, satellite dish, scanner, printer, wireless device, etc.

Radio(s) 524 represents a radio that facilitates communication with a wireless telecommunications network. Illustrative wireless telecommunications technologies include CDMA, GPRS, TDMA, GSM, and the like. Radio 524 might additionally or alternatively facilitate other types of wireless communications including Wi-Fi, WiMAX, LTE, or other VoIP communications. As can be appreciated, in various embodiments, radio(s) 524 can be configured to support multiple technologies and/or multiple radios can be utilized to support multiple technologies. A wireless telecommunications network might include an array of devices, which are not shown so as to not obscure more relevant aspects of the embodiments described herein. Components such as a base station, a communications tower, or even access points (as well as other components) can provide wireless connectivity in some embodiments.

Figure 6:
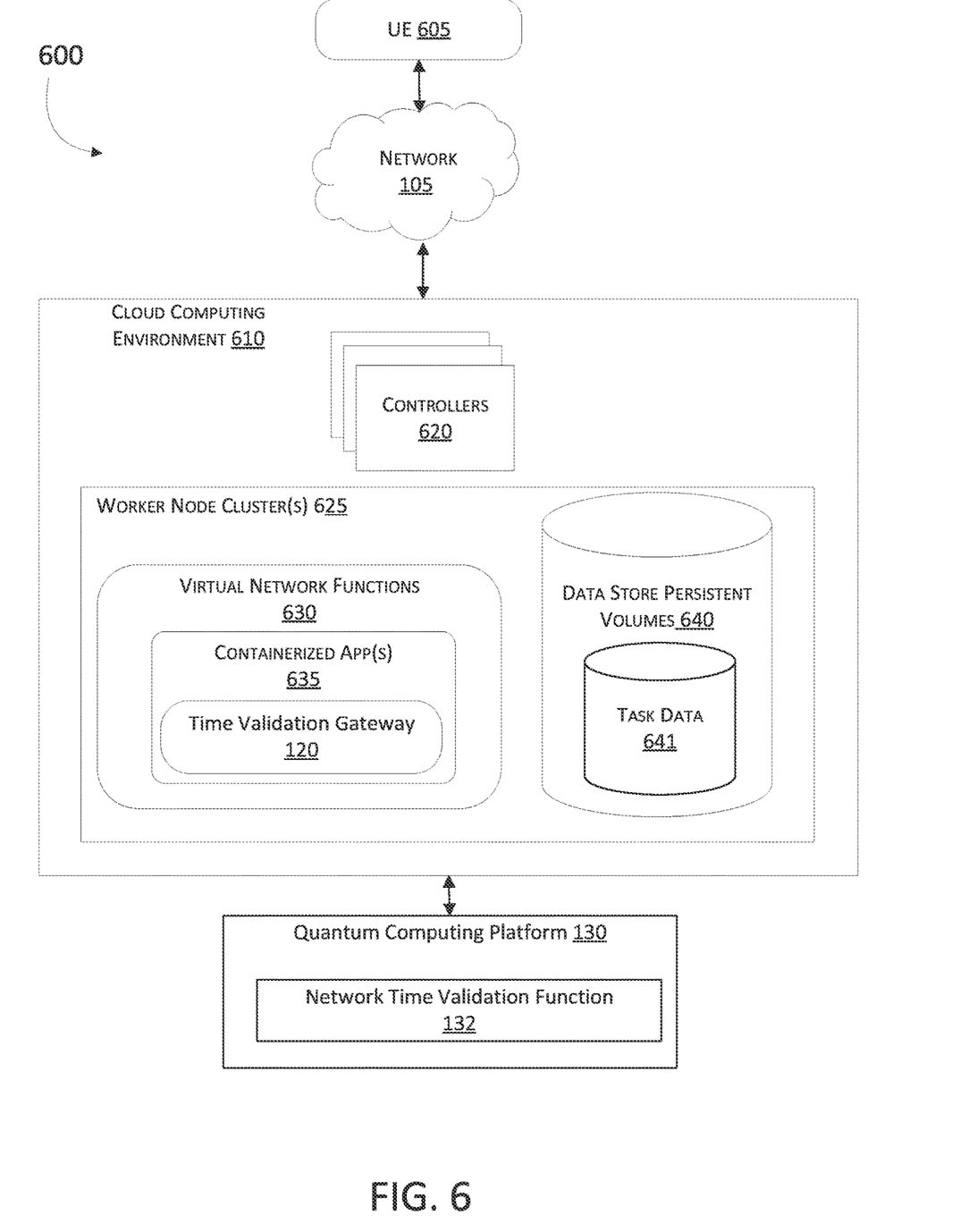
FIG. 6 is diagram illustrating an example cloud computing environment according to an embodiment.

Referring to FIG. 6, a diagram is depicted general at 600 of an exemplary cloud computing environment 610 for implementing one or more aspects of a time validation gateway as described in any of the examples of this disclosure (such as the time validation gateway 120, for example) and in some embodiments, a network time validation function (such as the network time validation function 132, for example). Cloud computing environment 610 is but one example of a suitable cloud computing environment and is not intended to suggest any limitation as to the scope of use or functionality of the embodiments presented herein. Neither should cloud computing environment 610 be interpreted as having any dependency or requirement relating to any one or combination of components illustrated. In some embodiments, the cloud computing environment 610 is executed within a node of network 105, or otherwise coupled to the network 105.

Cloud computing environment 610 includes one or more controllers 620 comprising one or more processors and memory. The controllers 620 may comprise servers of a data center. In some embodiments, the controllers 620 are programmed to execute code to implement at least one or more aspects of the time validation gateway 120.

For example, in one embodiment the time validation gateway 120 comprises one or more virtualized network functions (VNFs) 630 running on a worker node cluster 625 established by the controllers 620. The cluster of worker nodes 625 may include one or more orchestrated Kubernetes (K8s) pods that realize one or more containerized applications 635 for the time validation gateway 120, and in some embodiments, aspects of the network time validation function 132. In some embodiments, one or more US 605 (such as, for example, any of the UE 102 shown in FIG. 1) may be coupled to the controllers 620 of the cloud computing environment 610 by an access network 104 and/or network 105. In some embodiments, the set of network time reference signals (e.g., task data) 641 generated by the time validation gateway 120 for search by the network time validation function 132 may be collected at least in part as one or more data store persistent volumes 640 in the cloud computing environment 610.

In various alternative embodiments, system and/or device elements, method steps, or example implementations described throughout this disclosure (such as time validation gateway, network time validation function, network operator core, access networks, quantum computing platform, or any of the sub-parts thereof, for example) may be implemented at least in part using one or more computer systems, field programmable gate arrays (FPGAs), application specific integrated circuits (ASICs) or similar devices comprising a processor coupled to a memory and executing code to realize that elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to: punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system of device having a physical, tangible form. Program instructions include, but are not limited to, computer executable instructions executed by computer system processors and hardware description languages such as Very High Speed Integrated Circuit (VHSIC) Hardware Description Language (VHDL).

As used herein, terms such as network operator core, nodes, network nodes, modules, application function, network function, access network, user equipment (UE), gateway, data cache, and other terms derived from these words refer to the names of elements that would be understood by one skilled in the art of wireless telecommunications and related industries, and are not used herein as nonce words or nonce terms for the purpose of invoking 35 U.S.C. 112(f).

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system comprising:
one or more processors; and
one or more computer-readable media storing computer-usable instructions that, when executed by the one or more processors, cause the one or more processors to:
receive a plurality of network time reference signals from a network, the plurality of network time reference signals generated by one or more network clock sources;
select a set of network time reference signals for validation based on the plurality of network time reference signals;
forward the set of network time reference signals as task data to a network time validation function executing on a quantum computing platform, the network time validation function comprising at least a quantum search algorithm;
receive an indication of validation of the set of network time reference signals from the network time validation function; and
trigger at least one mitigation step based on a network clock degradation identified by the indication of validation.

2. The system of claim 1, wherein the plurality of network time reference signals are generated based on Global Navigation Satellite System (GNSS) broadcast timing sequences processed by at least one access network coupled to the network.

3. The system of claim 1, wherein the network comprises at least in part a telecommunications network, wherein one or more user equipment (UE) communicate with a network operator core via at least one access network using at least in part one or both of uplink (UL) radio frequency (RF) signals and downlink (DL) radio frequency (RF) signals.

4. The system of claim 3, wherein the one or more UE, the at least one access network, and the network operator core are synchronized with each other based on the plurality of network time reference signals.

5. The system of claim 1, the one or more processors further to:
trigger a mitigation step based on the network clock degradation identified by the indication of validation, the mitigation step comprising at least one of:
generate an alarm message, or
cause the network to switch to an alternative network clock source.

6. The system of claim 1, wherein the one or more processors comprise at least one quantum processor of the quantum computing platform.

7. The system of claim 1, wherein the network time validation function comprises an amplitude amplification based quantum search algorithm and a quantum oracle; and
wherein the amplitude amplification based quantum search algorithm performs operations on one or more quantum states generated by the quantum computing platform based on a search task function defined by the quantum oracle to identify the network clock degradation from the task data.

8. The system of claim 7, wherein the search task function comprises a time prediction task function, wherein the quantum oracle determines the network clock degradation based on one or more network time reference signals of task data that do not conform to timing predictions per the search task function.

9. The system of claim 7, wherein the search task function comprises a time prediction task function that includes one or both of a linear extrapolation function and a propagator-estimator function.

10. The system of claim 1, the one or more processors further to select the set of network time reference signals as a subset of the plurality of network time reference signals based on which of one or more nodes of the network the set of network time reference signals are received from.

11. A method comprising:
receiving a set of task data comprising a set of network time reference signals generated by one or more network clock sources;
searching the set of task data using a quantum search algorithm executed on a quantum computing platform, wherein the quantum search algorithm performs operations on more quantum states generated by the quantum computing platform based on a search task function defined by a quantum oracle, wherein the search task function comprises a time prediction task function; and
generating an output comprising an indication of validation of the set of network time reference signals based on the searching.

12. The method of claim 11, wherein the quantum search algorithm comprises an amplitude amplification based quantum search algorithm.

13. The method of claim 11, wherein the time prediction task function that includes one or both of a linear extrapolation function and a propagator-estimator function.

14. The method of claim 11, the method further comprising:
determining a network clock degradation based on one or more network time reference signals of the set of task data that do not conform to timing predictions of the search task function.

15. A telecommunications network, the network comprising:
a network operator core;
at least one access network coupled to the network operator core, wherein the at least one access network communicates uplink (UL) and downlink (DL) signals between the network operator core and one or more user equipment (UE) within a coverage area of the at least one access network, wherein the at least one access network generates a plurality of network time reference signals based on timing signals received from at least one satellite; and
a time validation gateway communicatively coupled to the at least one access network, the time validation gateway further coupled to a network time validation function hosted on a quantum computing platform, the time validation gateway comprising one or more processors that execute instructions to:
receive the plurality of network time reference signals;
select a set of network time reference signals for validation based on the plurality of network time reference signals;
forward the set of network time reference signals as task data to the network time validation function, the network time validation function comprising at least a quantum search algorithm;
receive an indication of validation of the set of network time reference signals from the network time validation function; and
trigger at least one mitigation step based on a network clock degradation identified by the indication of validation.

16. The network of claim 15, the one or more processors further to:
trigger a mitigation step based on the network clock degradation identified by the indication of validation, the mitigation step comprising at least one of:
generate an alarm message based on the network clock degradation, or
cause the telecommunications network to switch to an alternative network clock source based on the network clock degradation.

17. The network of claim 15, wherein the network time validation function executes an amplitude amplification based quantum search algorithm and a quantum oracle based on the task data; and
wherein the amplitude amplification based quantum search algorithm performs operations on one or more quantum states generated by the quantum computing platform based on a search task function defined by the quantum oracle to identify the network clock degradation from the task data.

18. The network of claim 17, wherein the search task function comprises a time prediction task function, wherein the quantum oracle determines the network clock degradation based on one or more network time reference signals of the task data that do not conform to timing predictions of the search task function.

19. The network of claim 17, wherein the search task function comprises a time prediction task function that includes one or both of a linear extrapolation function and a propagator-estimator function.

20. The network of claim 15, the one or more processors further to execute instructions to select the set of network time reference signals as a subset of the plurality of network time reference signals based on which of the at least one access network the set of network time reference signals are received from.

* * * * *